ically the generation of electricity wherein the
United States Patent Office 3,493,435
Patented Feb. 3, 1970

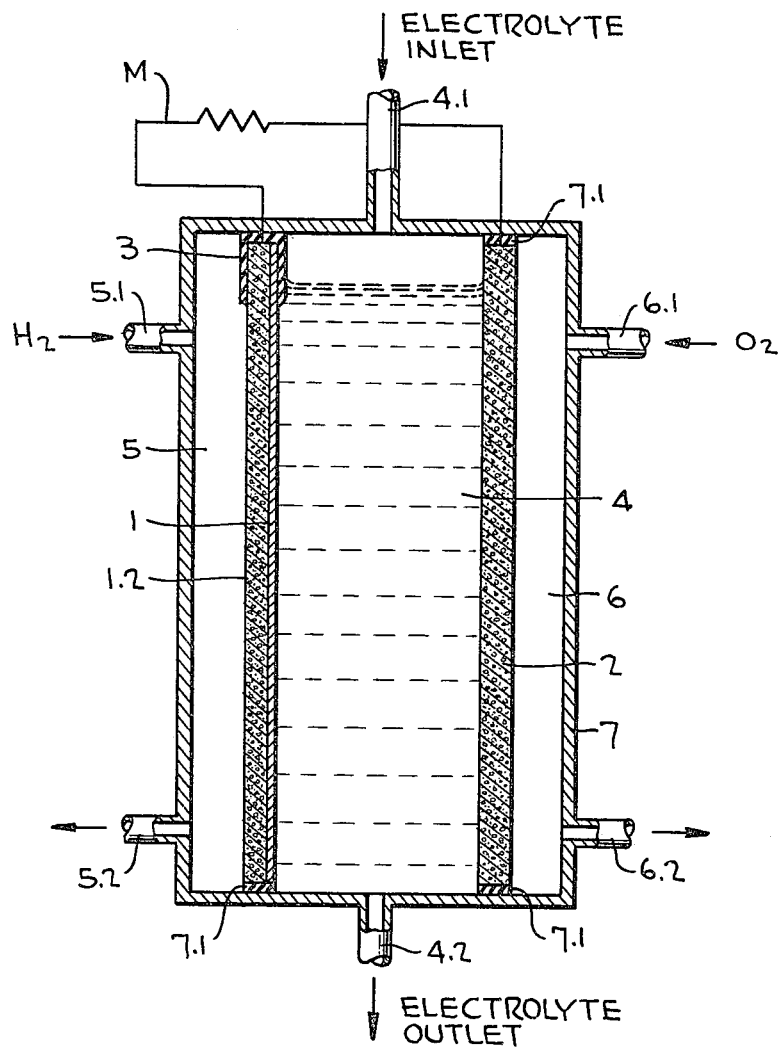

3,493,435
FUEL CELL AND METHOD OF GENERATING ELECTRICITY
Derek P. Gregory, Weybridge, England, assignor, by mesne assignments, to Leesona Corporation, Warwick, R.I., a corporation of Massachusetts
Filed June 30, 1966, Ser. No. 561,838
Int. Cl. H01m 27/22, 27/04
U.S. Cl. 136—86                 7 Claims

ABSTRACT OF THE DISCLOSURE

The disclosed fuel cell comprises a fuel electrode, an oxidant electrode, an electrolyte separating the electrodes, and a headspace above the electrolyte. A protective element covers the fuel electrode such that an air-electrolyte-electrode interface does not occur. Sealing off the fuel electrode from contact with the air-electrolyte interface prevents corrosion of the fuel electrode during shut-down and cool-down periods, i.e., when the cell is not producing electricity. The protective element is preferably a sleeve-like device comprising a fluorinated polymer or other non-conductive synthetic resin.

---

This invention relates to an improved fuel cell for the electromechanical generation of electricity wherein the overall cell reaction is the oxidation of a fuel by an oxidant such as oxygen or air. More particularly, the invention relates to a cell construction in which the anode or fuel electrode has an insulating sleeve or coating over or adjacent the section of the electrode which is in close proximity to the air-electrolyte interface.

A fuel cell of the type with which the present invention is concerned produces an electromotive force by bringing an oxidant and a fuel in contact with two suitable electrodes and an electrolyte without mixing the reactants. The fuel such as hydrogen gas is introduced at one electrode where it reacts electrochemically at the electrolyte interface to impart electrons to the electrode. Simultaneously, an oxidant such as air is introduced to the second electrode where it reacts electrochemically at the electrolyte interface to consume electrons at the electrode. Connecting the two electrodes by means of an external circuit causes an electrical current to flow in the circuit and draws electrical power from the cell. The overall cell reaction produces electrical energy which is the sum of the separate half cell reactions. A by-product of the reaction is formed as well as some heat.

In the operation of a cell, the fuel electrode is protected from substantial corrosion by its operating potential. However, if the cell is to be shut down, the fuel electrode will no longer be maintained at a "safe" potential, but will increase to the corrosion potential of the electrode. If oxygen is free to adsorb on the electrode surface, a complete anodic and cathodic process will occur. Thus, the reaction at the fuel electrode-electrolyte interface in the presence of air is—

Anodic process:
$$M \rightarrow M^{++} + 2e^-$$
Cathodic process:
$$\tfrac{1}{2}O_2 + H_2O + 2e^- \rightarrow 2OH^-$$
Total cell process:
$$M + \tfrac{1}{2}O_2 + H_2O \rightarrow M^{++} + 2OH^- \rightarrow M(OH)_2$$

The aforesaid phenomenon detrimentally affects the electrodes as a result of the corrosion, substantially reducing the shelf and operating life of the fuel cell.

Accordingly, it is a primary object of the present invention to provide a fuel cell wherein the fuel electrode is not substantially affected by corrosion during the shut-down and cool-down periods.

It is another object of this invention to provide a fuel cell wherein the fuel electrode of the cell is completely free of contact with an oxidizing agent such as air or oxygen.

These and other objects of the present invention will be more fully apparent from the following detailed description, with particular reference to the illustrative drawing.

According to the present invention, it has been discovered that the corrosive action on the fuel electrode encountered in the shut-down period, or in the inactive period can be prevented by completely sealing the fuel electrode to air or oxygen, thereby eliminating the environment required for a cathodic process. Preferably, the aforesaid is accomplished by placing an insulating sleeve or coating on the fuel electrode, covering the portion of the electrode which would normally contact the electrolyte in the presence of oxygen. The sleeve, or coating, will be carried sufficiently below the electrolyte surface to make the oxygen diffusion path long enough to reduce the corrosion rate to acceptable levels. Normally, this will be from about ⅛ to ½ inch below the electrolyte surface. The sleeve, or protective coating, can be fabricated from a non-conductive plastic such as polytetrafluoroethylene, polyvinylchloride, acrylonitrile, or the like, or from a metal which is a non-catalyst for the cathodic reduction of oxygen. In view of its superior properties in resisting the deleterious affects of the electrolyte under the operating conditions of a fuel cell, polytetrafluoroethylene or some other fluoro-carbon polymers is preferred.

More specifically, referring to the illustrative drawing which is a diagrammatic illustration of a fuel cell according to the invention, the anode 1 is a non-porous palladium-silver alloy membrane of the type referred to in Oswin U.S. Patent No. 3,092,517 adjacent a porous nickel support 1.2. Cathode 2 comprises a nickel oxide-cobalt oxide porous sinter. The fuel electrode has a polytetrafluoroethylene sleeve 3 over the electrode extending down approximately a quarter of an inch below the electrolyte level of the electrodes. Electrolyte 4 (in the embodiment shown) is a 30 percent aqueous potassium hydroxide solution. In operation, the electrolyte concentration is maintained by adding electrolyte through inlet tube 4.1 or removing diluted electrolyte through outlet tube 4.2. Reactant gas such as hydrogen is fed into the fuel compartment 5 through inlet 5.1 and impurities and the like vented through outlet 5.2. Oxidant is fed into oxidant compartment 6 through inlet 6.1 and vented through outlet 6.2. The electrodes are insulated from the cell housing 7 by means of insulators 7.1 and sleeve 3. The electrical circuit is completed by means of external circuit M.

A fuel cell of the aforesaid type when operated at 250° C. and impure hydrogen fed at a rate of 84 liters per hour at a pressure of 8 p.s.i., and oxygen fed at a rate of 42 liters per hour at a pressure of 8 p.s.i. per square foot of electrode surface will provide a current density of 200 amps per square foot at 0.7 volt. The cell will operate with intermittent shut-down periods with no evidence of electrode corrosion.

Although the present invention is described with reference to a fuel cell employing a non-porous hydrogen diffusion anode, the principles involved apply as well to other electrodes such as metal sinters, lightweight screen electrodes, and the like.

As will be apparent to one skilled in the art, it is possible to produce other embodiments without departing from the inventive concepts herein disclosed and covered by the appended claims.

It is claimed:
1. In a fuel cell comprising a cell housing; a non-consumable metal-containing fuel electrode of substantially uniform composition from the top to the bottom of said cell housing and a non-consumable oxidant electrode disposed within said housing constructed and arranged to provide a space between the said electrodes; an aqueous electrolyte partially filling the said space between the said electrodes to provide a headspace above the electrolyte surface containing oxidant; said electrodes, said housing, and a surface of the said electrolyte thereby defining said headspace above said electrolyte, the improvement wherein a protective element covers the non-consumable fuel electrode at the said surface of the electrolyte and discontinues just below the surface of said electrolyte, said protective element being constructed and arranged such that the electrolyte/headspace interface is in contact with the protective element rather than the fuel electrode to prevent corrosion to said fuel electrode by the oxidant of the cell.

2. The fuel cell of claim 1 wherein the protective element is a plastic sleeve.

3. The fuel cell of claim 2 wherein the plastic sleeve comprises polytetrafluoroethylene.

4. The fuel cell of claim 1 wherein the fuel electrode is a palladium-silver alloy membrane.

5. In the method of generating electricity directly from a fuel and oxidant in a fuel cell comprising a cell housing, a non-consumable metal-containing fuel electrode of substantially uniform composition from the top to the bottom of said cell housing, a non-consumable oxidant electrode, and an aqueous electrolyte, said electrodes being spaced part and said electrolyte partially filling the space between the said electrodes thus defining a headspace above the said electrolyte which contains oxidant, the improvement wherein the non-consumable fuel electrode is protected from corrosion by covering the non-consumable fuel electrode at the electrolyte/electrode/headspace interface with a protective element which is discontinued just below the surface of said electrolyte, thus preventing a headspace/electrolyte/electrode interface from occurring thereby preventing corrosion to said non-consumable fuel electrode by said oxidant.

6. The method of claim 5 wherein the protective element is a plastic sleeve.

7. The method of claim 6 wherein the plastic sleeve is polytetrafluoroethylene.

References Cited

UNITED STATES PATENTS

| | | | |
|---|---|---|---|
| 2,667,525 | 1/1954 | Hersch | 136—168 X |
| 2,901,523 | 8/1959 | Justi et al. | 136—86 |
| 3,133,837 | 5/1964 | Eidensohn | 136—86 |
| 3,215,562 | 11/1965 | Hindin | 136—86 |
| 3,251,718 | 5/1966 | Hilton | 136—86 |
| 3,291,643 | 12/1966 | Oswin et al. | 136—86 |
| 3,337,369 | 8/1967 | Frazier | 136—86 |
| 3,350,226 | 10/1967 | Lieb | 136—86 |

ALLAN B. CURTIS, Primary Examiner